(12) United States Patent
Baek et al.

(10) Patent No.: US 11,572,885 B2
(45) Date of Patent: Feb. 7, 2023

(54) METHOD AND APPARATUS FOR COMPRESSOR

(71) Applicant: LG ELECTRONICS INC., Seoul (KR)

(72) Inventors: Seongki Baek, Seoul (KR); Kiwook Lee, Seoul (KR); Sena Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 17/210,850

(22) Filed: Mar. 24, 2021

(65) Prior Publication Data

US 2021/0301828 A1   Sep. 30, 2021

(30) Foreign Application Priority Data

Mar. 27, 2020   (KR) .................. 10-2020-0037529

(51) Int. Cl.
| | |
|---|---|
| F04D 27/00 | (2006.01) |
| F04D 27/02 | (2006.01) |
| F04D 29/043 | (2006.01) |
| F04D 29/051 | (2006.01) |
| F04D 29/66 | (2006.01) |

(52) U.S. Cl.
CPC .......... *F04D 27/001* (2013.01); *F04D 27/02* (2013.01); *F04D 29/043* (2013.01); *F04D 29/0513* (2013.01); *F04D 29/661* (2013.01)

(58) Field of Classification Search
CPC ...... F04D 27/001; F04D 27/02; F04D 29/661; F04D 29/058; F04D 17/10; F25B 49/022
See application file for complete search history.

(56) References Cited

U.S. PATENT DOCUMENTS

| | | | | |
|---|---|---|---|---|
| 5,247,253 A | * | 9/1993 | Bowman ................. | G01B 7/023 324/207.16 |
| 7,030,626 B2 | * | 4/2006 | Hayashi ................... | G01V 3/10 324/207.15 |

(Continued)

FOREIGN PATENT DOCUMENTS

| | | |
|---|---|---|
| JP | 2007-086060 A | 4/2007 |
| KR | 10-2020-0023836 | 3/2020 |

OTHER PUBLICATIONS

Notice of Allowance issued in Korean Patent Application No. 10-2020-0037529, dated Jul. 15, 2021 (2 pages).

*Primary Examiner* — Topaz L. Elliott
*Assistant Examiner* — Jackson N Gillenwaters
(74) *Attorney, Agent, or Firm* — Birch, Stewart, Kolasch & Birch, LLP

(57) ABSTRACT

A compressor is provided. The compressor according to the present disclosure includes: one or more impellers suctioning and compressing refrigerant; a motor rotating the impeller; a rotation shaft to which the impeller and the motor are connected; a gap sensor measuring a displacement change of the rotation shaft as a frequency change; a temperature compensation sensor determining a frequency compensation value according to a temperature change around the gap sensor; and a control unit calculating a displacement amount of the rotation shaft by reflecting the frequency compensation value provided by the temperature compensation sensor and the frequency change measured by the gap sensor.

18 Claims, 6 Drawing Sheets

(56) References Cited

U.S. PATENT DOCUMENTS

| | | | |
|---|---|---|---|
| 7,173,411 B1* | 2/2007 | Pond | H03K 17/9502 |
| | | | 324/225 |
| 8,008,909 B2* | 8/2011 | Feucht | G01D 5/22 |
| | | | 324/207.15 |
| 2017/0097006 A1* | 4/2017 | Hossain | F04D 29/058 |
| 2018/0058460 A1* | 3/2018 | Lee | F04D 29/058 |
| 2021/0115929 A1* | 4/2021 | Nakazawa | F04D 27/0261 |

\* cited by examiner

METHOD AND APPARATUS FOR COMPRESSOR

CROSS-REFERENCE TO RELATED APPLICATION

This application claims the benefit of priority to Korean Patent Application No. 10-2020-0037529, filed on Mar. 27, 2020, in the Korean Intellectual Property Office, the disclosure of which is incorporated herein by reference in its entirety.

BACKGROUND

Technical Field

The present disclosure relates to a compressor and method thereof.

Background Information

In general, a chiller system supplies cold water to a cold water demand place, and is characterized in that heat exchange is performed between refrigerant circulating in a refrigeration system and cold water circulating between the cold water demand place and the refrigeration system to cool the cold water. Such the chiller system is a large-capacity facility and may be installed in a large-scale building.

A conventional chiller system is disclosed in KR2010-1084477. In the chiller system as disclosed in the publication, a surge phenomenon caused by a compressor that rotates is a problem. A surge occurs when a compression ratio of the compressor is high compared to a flow rate of refrigerant and refers to a phenomenon in which a flow of the refrigerant becomes irregular due to a rotation body of the compressor being idle. When such this surge phenomenon occurs, the compressor cannot produce a pressure greater than a pressure resistance of a system.

Therefore, when the surge phenomenon occurs, there is a problem in that the refrigerant backflow occurs repeatedly, causing to frequent damage to the compressor.

So, in order to prevent damage to the compressor due to the surge phenomenon occurring in the chiller system, a position of the rotation shaft is sensed and the position of the rotation shaft is adjusted.

A gap sensor is used to detect the position of the rotation shaft, and an output value of the gap sensor does not change at a certain distance/certain temperature during chiller operation, but the output value of the gap sensor changes at a certain distance in a situation where a temperature changes according to changes in operating conditions.

If the amount of change according to the temperature is small, there is no problem, but in some cases, because there is a difference for each gap sensor, the amount of change appears large, in this case, a problem occurs in that a distance measurement value is different and affects the control.

SUMMARY

It is an object of the present disclosure to accurately detect a surge generated in a compressor according to a temperature of refrigerant and a temperature of the compressor.

It is another object of the present disclosure to respond quickly when the surge occurs in the compressor to prevent damage to the compressor.

It is another object of the present disclosure to prevent a rotation shaft from being eccentric in one direction, which occurs when a surge occurs, with a small force and a small current.

In order to achieve the above object, the compressor according to an embodiment of the present disclosure is characterized in that the distance to the rotation shaft measured by a gap sensor is corrected through a temperature compensation sensor.

In accordance with an aspect of the present disclosure, the above and other objects can be accomplished by providing a blower, including In accordance with an aspect of the present disclosure, the above and other objects can be accomplished by providing a compressor, including one or more impellers suctioning and compressing refrigerant; a motor rotating the impeller; a rotation shaft to which the impeller and the motor are connected; a gap sensor measuring a displacement change of the rotation shaft as a frequency change; a temperature compensation sensor determining a frequency compensation value according to a temperature change around the gap sensor; and a control unit calculating a displacement amount of the rotation shaft by reflecting the frequency compensation value provided by the temperature compensation sensor and the frequency change measured by the gap sensor.

According to another aspect of the present disclosure, the temperature compensation sensor may measure a temperature change as the frequency change to determine the frequency compensation value.

According to another aspect of the present disclosure, the temperature compensation sensor may be disposed farther from the rotation shaft than the gap sensor.

According to another aspect of the present disclosure, the temperature compensation sensor may be spaced apart from the rotation shaft by exceeding a measurement range.

According to another aspect of the present disclosure, the temperature compensation sensor may have a same configuration as the gap sensor and is spaced apart from the rotation shaft by exceeding a measurement range.

According to another aspect of the present disclosure, the compressor further includes at least two thrust bearings limiting vibration of the rotation shaft in an axial direction, and the control unit determines a surge occurrence condition based on the frequency compensation value provided by the temperature compensation sensor and the frequency change measured by the gap sensor.

According to another aspect of the present disclosure, the thrust bearing may include a first thrust bearing and a second thrust bearing positioned closer to the impeller than the first thrust bearing, and at least a part of the rotation shaft may be positioned between the first thrust bearing and the second thrust bearing.

According to another aspect of the present disclosure, when the surge occurrence condition is satisfied, the control unit may supply current to only the first thrust bearing among the first and second thrust bearings.

According to another aspect of the present disclosure, when the surge occurrence condition is satisfied, the control unit may control amount of current supplied to the first thrust bearing to be greater than amount of current supplied to the second thrust bearing.

According to another aspect of the present disclosure, the rotation shaft may further include a rotation shaft blade extending in a rotary radial direction of the rotation shaft, and the rotation shaft blade may be positioned between the first thrust bearing and the second thrust bearing.

According to another aspect of the present disclosure, the gap sensor may measure an axial movement of the rotation shaft.

According to another aspect of the present disclosure, when a position of the rotation shaft measured by the gap sensor is out of a normal position range, the control unit may determine that the surge occurrence condition is satisfied.

According to another aspect of the present disclosure, when a position of the rotation shaft measured by the gap sensor is positioned within a normal position range, the control unit may determine that a surge non-occurrence condition is satisfied.

According to another aspect of the present disclosure, when the surge non-occurrence condition is satisfied, the control unit may equally adjust amount of current supplied to the first thrust bearing and amount of current supplied to the second thrust bearing.

According to another aspect of the present disclosure, the temperature compensation sensor may determine the frequency compensation value by measuring the temperature around the gap sensor.

According to another aspect of the present disclosure, the compressor may further include at least two thrust bearings limiting vibration of the rotation shaft in the axial direction, and the control unit may determine a surge occurrence condition based on the frequency compensation value provided by the temperature compensation sensor and the frequency change measured by the gap sensor.

According to another aspect of the present disclosure, the thrust bearing may include a first thrust bearing and a second thrust bearing positioned closer to the impeller than the first thrust bearing, and at least a part of the rotation shaft may be positioned between the first thrust bearing and the second thrust bearing.

According to another aspect of the present disclosure, when the surge occurrence condition is satisfied, the control unit may supply current to only the first thrust bearing among the first and second thrust bearings.

According to another aspect of the present disclosure, when the surge occurrence condition is satisfied, the control unit may control amount of current supplied to the first thrust bearing to be greater than amount of current supplied to the second thrust bearing.

According to another aspect of the present disclosure, when a position of the rotation shaft measured by the gap sensor is out of a normal position range, the control unit may determine that the surge occurrence condition is satisfied.

Details of other embodiments are included in the detailed description and drawings.

DETAILED DESCRIPTION

Figure 1:
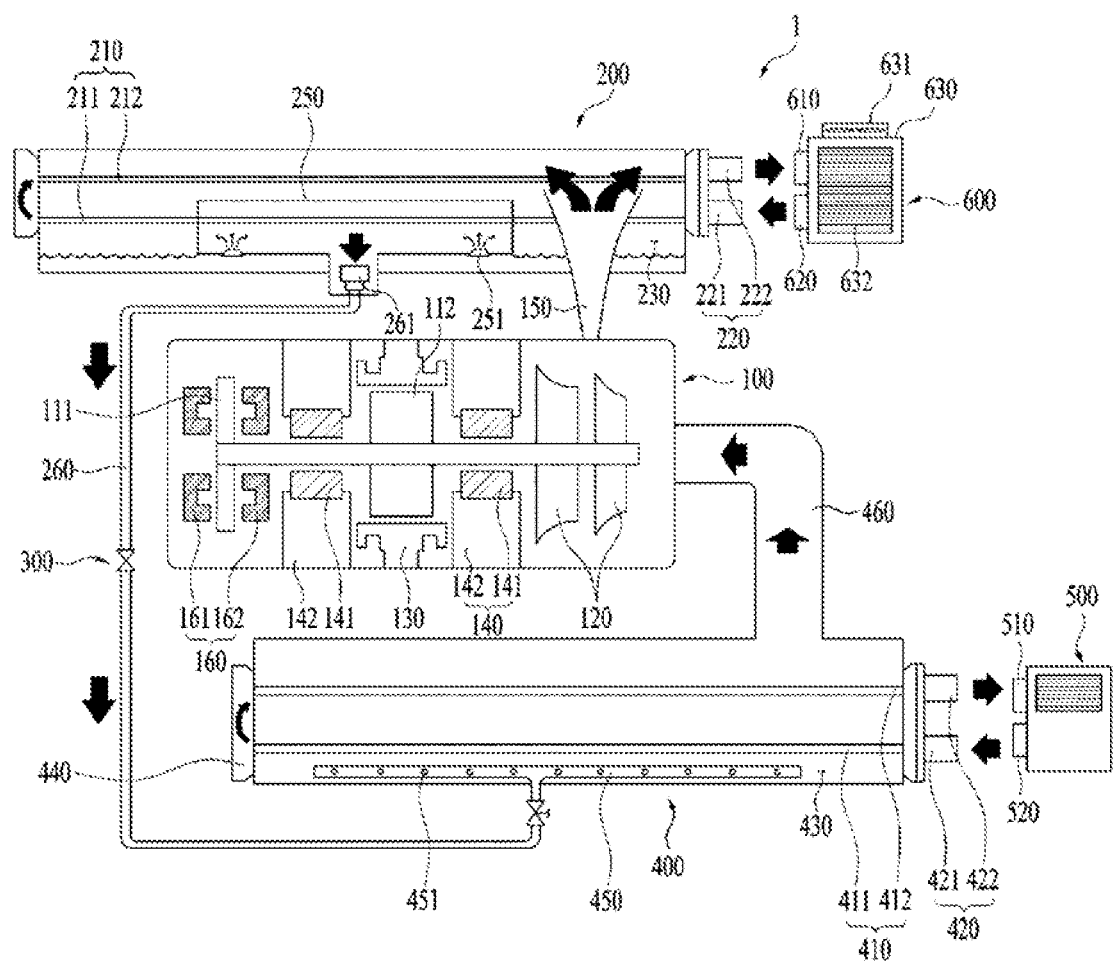
FIG. 1 is a view showing a chiller system according to an embodiment of the present disclosure.

Advantages and features of the present disclosure, and a method of achieving them will become apparent with reference to the embodiments described below in detail together with the accompanying drawings. However, the present disclosure is not limited to the embodiments disclosed below, but may be implemented in various different forms, only these embodiments are provided to complete the present disclosure and to completely inform the scope of the disclosure to those of ordinary skill in the art to which the present disclosure pertains, and the present disclosure is only defined by the scope of the claims.

As shown in the drawings, the spatially relative term "below", "beneath", "lower", "above" and "upper" etc. may be used to easily describe the correlation between one component and other components. The spatially relative terms should be understood as terms including each different directions of components during use or operation in addition to the directions shown in the drawings. For example, if a component shown in the drawing is turned over, the component described as "below" or "beneath" of another component may be disposed "above" another component. Accordingly, the exemplary term "below" may include both directions below and above. Components may be disposed in other directions, and thus spatially relative terms may be interpreted according to the direction.

Terms used in the present specification are for describing exemplary embodiments and are not intended to limit the present disclosure. In this specification, the singular form also includes the plural form unless specifically stated in the phrase. "comprises" and/or "comprising" as used in the specification does not exclude the presence or addition of one or more other components, steps and/or actions to the mentioned components, steps and/or actions.

Unless otherwise defined, all terms (including technical and scientific terms) used in the present specification may be used with meanings that can be commonly understood by those of ordinary skill in the art to which the present disclosure belongs. In addition, terms defined in a commonly used dictionary are not interpreted ideally or excessively unless explicitly defined specifically.

In the drawings, the thickness or size of each component is exaggerated, omitted, or schematically illustrated for convenience and clarity of description. In addition, the size and area of each component do not fully reflect the actual size or area.

Hereinafter, referring to the accompanying drawings, a preferred embodiment of the present disclosure will be described as follows.

Hereinafter, the present disclosure will be described with reference to the drawings for describing a compressor according to embodiments of the present disclosure.

FIG. 1 is a view showing a chiller system having a compressor 100 of the present disclosure. Meanwhile, the compressor 100 according to an embodiment of the present disclosure not only function as a part of the chiller system but also may be included in an air conditioner, and the compressor 100 may be included in any device for compressing gaseous substances.

FIG. 1, a chiller system 1 according to an embodiment of the present disclosure includes a compressor 100 formed to compress a refrigerant, a condenser 200 for condensing the refrigerant by heat exchange between the refrigerant compressed in the compressor 100 and cooling water, an expander 300 to expand the refrigerant condensed in the condenser 200, and an evaporator 400 formed to cool cold water and to evaporate the refrigerant by heat exchange between the refrigerant and cold water expanded in the expander 300.

In addition, the chiller system 1 according to an embodiment of the present disclosure further includes a cooling water unit 600 that heats the cooling water through heat exchange between the refrigerant condensed in the condenser 200 and the cooling water, and an air conditioning unit 500 that cools cold water through heat exchange between the refrigerant expanded in the evaporator 400 and cold water.

The condenser 200 provides a place for heat exchange between high-pressure refrigerant compressed by the compressor 100 and cooling water introduced from the cooling water unit 600. The high-pressure refrigerant is condensed through heat exchange with cooling water.

The condenser 200 may be configured as a shell-tube type heat exchanger. Specifically, the high-pressure refrigerant compressed by the compressor 100 is introduced into a condensation space 230 corresponding to an internal space of the condenser 200 through a condenser connection passage 150. In addition, the condensation space 230 includes a cooling water passage 210 through which cooling water introduced from the cooling water unit 600 can flow.

The cooling water passage 210 is composed of a cooling water inlet passage 211 through which cooling water is introduced from the cooling water unit 600 and a cooling water discharge passage 212 through which cooling water is discharged to the cooling water unit 600. The cooling water heat-exchanges with the refrigerant in the condensation space 230 and then is introduced into the cooling water discharge passage 212 through a cooling water connection passage provided inside or outside the condenser 200.

The cooling water unit 600 and the condenser 200 are connected via a cooling water tube 220. The cooling water tube 220 may be formed of a material such as rubber so that the cooling water flows between the cooling water unit 600 and the condenser 200 as well as to prevent leakage to the outside.

The cooling water tube 220 is composed of a cooling water inlet tube 221 connected to the cooling water inlet passage 211 and a cooling water discharge tube 222 connected to the cooling water discharge passage 212. Looking at the flow of the cooling water as a whole, the cooling water that has completed heat exchange with air or liquid in the cooling water unit 600 flows into the condenser 200 through the cooling water inlet tube 221. The cooling water introduced into the condenser 200 passes through the cooling water inlet passage 211, the cooling water connection passage 240, and the cooling water discharge passage 212 provided in the condenser 200 in order, exchanges heat with the refrigerant introduced into the condenser 200, and then passes through the cooling water discharge tube 222 and is introduced into the cooling water unit 600 again.

Meanwhile, the cooling water absorbing heat of the refrigerant through heat exchange in the condenser 200 may be air-cooled in the cooling water unit 600. The cooling water unit 600 is composed of a main body 630, a cooling water inlet pipe 610 that is an inlet through which the cooling water absorbing heat is introduced through the cooling water discharge tube 222, and a cooling water discharge pipe 620 that is an outlet through which the cooling water is discharged after being cooled inside the cooling water unit 600.

The cooling water unit 600 may use air to cool the cooling water introduced into the main body 630. Specifically, the main body 630 is composed of an air outlet 631 through which a fan for generating air flow is provided, and an air inlet 632 corresponding to an inlet through which air is introduced into the main body 630.

Air discharged after heat exchange at the air discharge port 631 may be used for heating. Refrigerant that has been heat-exchanged in the condenser 200 is condensed and accumulated under the condensation space 230. Accumulated refrigerant is introduced into the expander 300 after introduced into a refrigerant box 250 provided in the condensation space 230.

Accumulated refrigerant is introduced into the refrigerant inlet 251, and introduced refrigerant is discharged into an evaporator connection passage 260. The evaporator connection passage 260 includes an evaporator connection passage inlet 261, and the evaporator connection passage inlet 261 may be positioned in a lower part of the refrigerant box 250.

The evaporator 400 includes an evaporation space 430 in which heat exchange occurs between the refrigerant expanded in the expander 300 and cold water. Refrigerant that has passed through the expander 300 in the evaporator connection passage 260 is introduced into a refrigerant injection device 450 provided in the evaporator 400, passes through a refrigerant injection hole 451 provided in the refrigerant injection device 450, and spreads evenly into the evaporator 400.

In addition, a cold water passage 410 is provided inside the evaporator 400, and the cold water passage 410 includes a cold water inlet passage 411 through which cold water is introduced into the evaporator 400 and a cold water discharge passage 412 through which cold water is discharged to an outside of the evaporator 400.

Cold water is introduced or discharged through a cold water tube 420 communicating with the air conditioning unit 500 provided outside the evaporator 400. The cold water tube 420 is composed of a cold water inlet tube 421 that is a passage through which cold water inside the air conditioning unit 500 flows into the evaporator 400 and a cold water discharge tube 422 that is a passage through which cold water that has been heat-exchanged in the evaporator 400 is discharged to the air conditioning unit 500. That is, the cold water inlet tube 421 is in communication with the cold water inlet passage 411 and the cold water discharge tube 422 is in communication with the cold water outlet passage 412.

Looking at a flow of cold water, cold water passes through the air conditioning unit 500, the cold water inlet tube 421 and the cold water inlet passage 411, and passes through an inner end of the evaporator 400 or the cold water connection passage 440 provided outside the evaporator 400 after, and is introduced into the air conditioning unit 500 through the cold water discharge passage 412 and the cold water discharge tube 422 again.

The air conditioning unit 500 cools cold water through refrigerant. Cooled cold water absorbs heat of air in the air conditioning unit 500 to allow indoor cooling. The air conditioning unit 500 includes a cold water discharge pipe 520 in communication with the cold water inlet tube 421 and a cold water inlet pipe 510 in communication with the cold water discharge tube 422. Refrigerant that has completed heat exchange in the evaporator 400 is introduced into the compressor 100 through the compressor connection passage 460 again.

Figure 2:
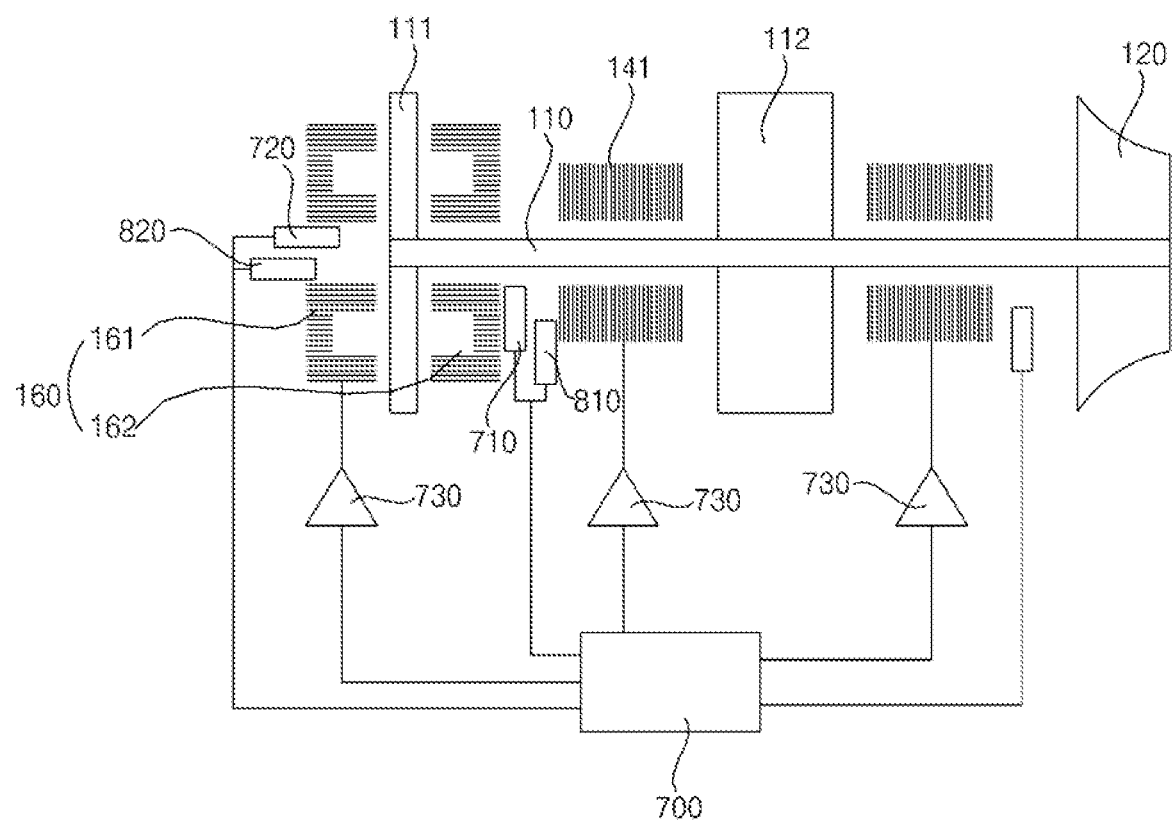
FIG. 2 is a view showing a structure of a compressor according to an embodiment of the present disclosure.
Figure 3:
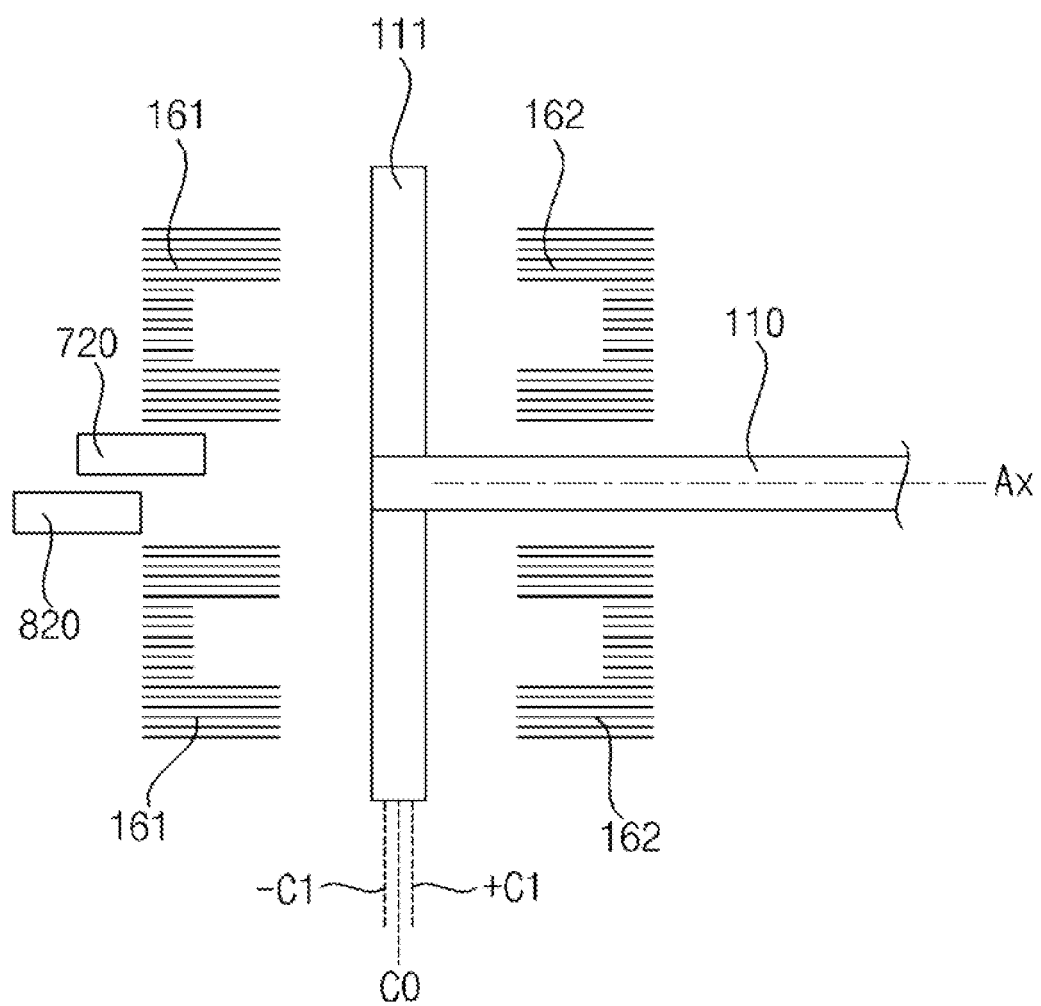
FIG. 3 is a view showing a case in which a compressor according to an embodiment of the present disclosure satisfies a surge non-occurrence condition.
Figure 4:
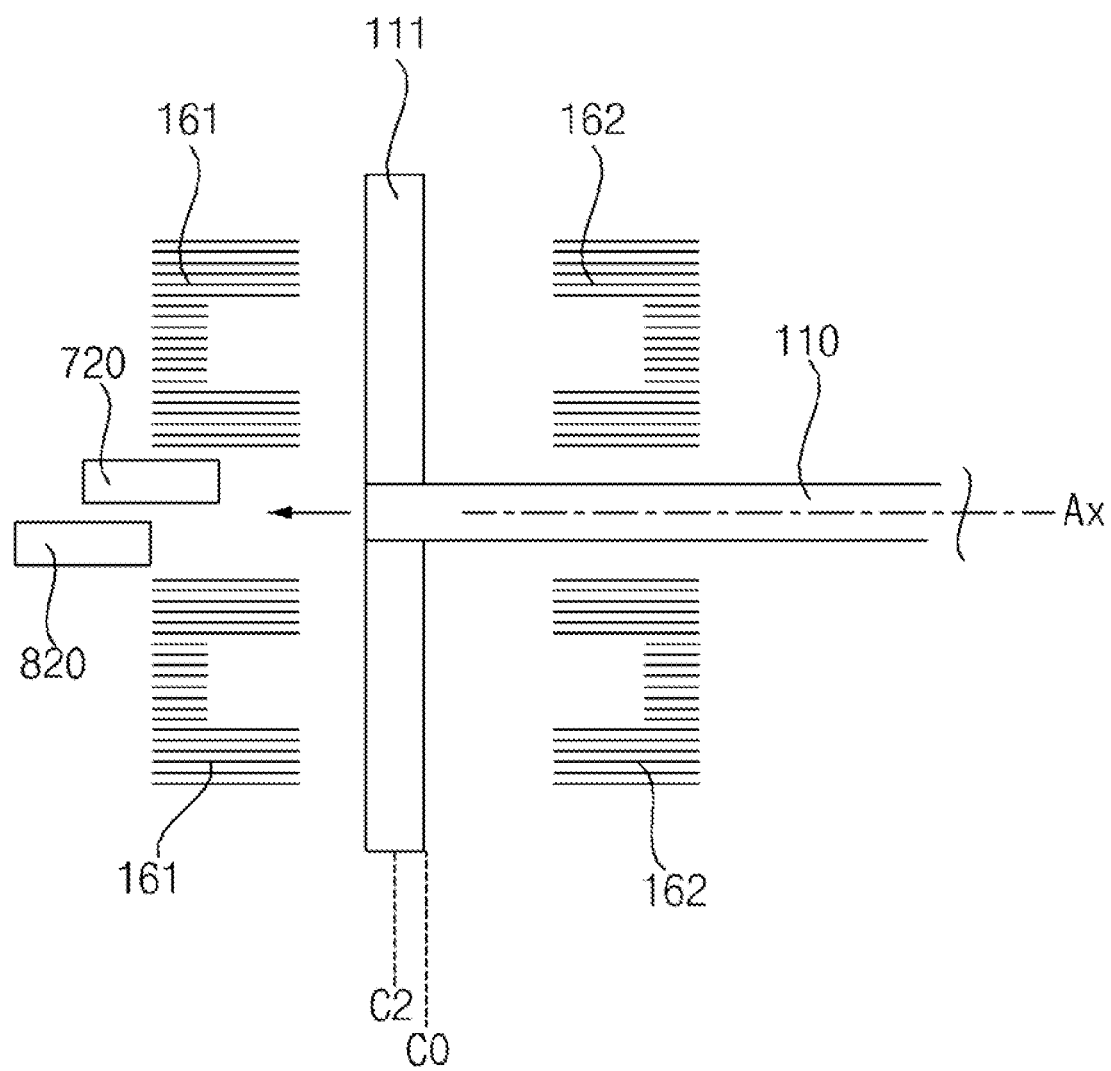
FIG. 4 is a view showing a case in which a compressor according to an embodiment of the present disclosure satisfies a surge occurrence condition.

FIG. 2 is a view showing a centrifugal compressor 100 (aka, a turbo compressor) according to an embodiment of the present disclosure.

The compressor 100 according to FIG. 2 includes at least one impeller 120 that sucks refrigerant in an axial direction Ax and compresses it in a centrifugal direction, a rotation shaft 110 to which the impeller 120 and a motor 130 for rotating the impeller 120 are connected, a bearing unit 140 including a plurality of magnetic bearings 141 supporting the rotation shaft 110 so as to be rotatable in the air and a bearing housing 142 supporting the magnetic bearing 141, a gap sensor 70 that senses a distance from the rotation shaft 110 and a thrust bearing 160 that limits the rotation shaft 110 from vibrating in the axial direction Ax.

In addition, the compressor 100 may further include a temperature compensation sensor 80.

The impeller 120 is generally composed of one or two stages, and may be composed of a plurality of stages. The impeller 120 rotates by the rotation shaft 110 and serves to make the refrigerant high pressure by compressing the refrigerant introduced in the axial direction Ax by rotation in a centrifugal direction.

The motor 130 may have a separate rotation shaft different from the rotation shaft 110 and may have a structure that transmits rotational force to the rotation shaft 110 by a belt (not shown), but in the case of an embodiment of the present disclosure the motor 130 is composed of a stator (not shown) and a rotor 112, and rotates the rotation shaft 110.

The rotation shaft 110 is connected to the impeller 120 and the motor 13. The rotation shaft 110 extends in a left-right direction of FIG. 2. Hereinafter, the axial direction Ax of the rotation shaft 110 means the left-right direction. It is preferable that the rotation shaft 110 includes a metal so as to be movable by the magnetic force of the magnetic bearing 141 and a thrust bearing 160.

In order to prevent vibration in the axial direction Ax (the left-right direction) by the thrust bearing 160, it is preferable that the rotation shaft 110 has a certain area in a plane perpendicular to the axial direction Ax. Specifically, the rotation shaft 110 may further include a rotation shaft blade 111 that provides sufficient magnetic force to move the rotation shaft 110 by the magnetic force of the thrust bearing 160. The rotation shaft blade 111 may have an area larger than a cross-sectional area of the rotation shaft 110 in a plane perpendicular to the axial direction Ax. The rotation shaft blade 111 may be formed to extend in a radial direction of rotation of the rotation shaft 110.

The magnetic bearing 141 and the thrust bearing 160 are composed of a conductor and have a coil 143 wound thereon. The magnetic bearing 141 and the thrust bearing 160 serve as a magnet by current flowing through the coil 143 wound thereon.

The magnetic bearings 141 are provided with a plurality of magnetic bearings 141 to surround the rotation shaft 110 with the rotation shaft 110 as the center, and the thrust bearing 160 is provided to be adjacent to the rotation shaft blade 111 provided to extend in a rotational radial direction of the rotation shaft 110.

The magnetic bearing 141 allows the rotation shaft 110 to rotate without friction in a state in which the rotation shaft 110 floating in the air. For this, at least three magnetic bearings 141 should be provided with the rotation shaft 110 as the center, and each magnetic bearing 141 should be installed so as to be balanced about the rotation shaft 110 as the center.

In the case of an embodiment of the present disclosure, four magnetic bearings 141 are provided so as to be symmetrical about the rotation shaft 110, the rotation shaft 110 is floated in the air by magnetic force generated by the coil wound on each magnetic bearing 141. As the rotation shaft 110 is floated in the air and rotates, energy lost due to friction is reduced unlike a conventional disclosure having a bearing.

Meanwhile, the compressor 100 may further include a bearing housing 142 supporting the magnetic bearing 141. A plurality of magnetic bearings 141 are provided and are installed with a gap so as not to contact the rotation shaft 110.

The plurality of magnetic bearings 141 are installed at least at two points of the rotation shaft 110. The two points correspond to different points along a longitudinal direction of the rotation shaft 110. Since the rotation shaft 110 corresponds to a straight line, vibration in a circumferential direction may be prevented by supporting the rotation shaft 110 at two points.

Looking at a refrigerant flow, refrigerant introduced into the compressor 100 through the compressor connection passage 460 is compressed in the circumferential direction by an action of the impeller 120 and then discharged to the condenser connection passage 150. The compressor connection passage 460 is connected to the compressor 100 so that the refrigerant is introduced in a direction perpendicular to the rotation direction of the impeller 120.

The thrust bearing 160 limits the movement of the rotation shaft 110 due to vibration in the axial direction Ax and prevents the rotation shaft 110 from colliding with other components of the compressor 100 while moving in a direction of the impeller 120 when the surge occurs.

Specifically, the thrust bearing 160 is composed of a first thrust bearing 161 and a second thrust bearing 162, and is disposed so as to surround the rotation shaft blade 111 in the axial direction Ax of the rotation shaft 110. That is, in the axial direction Ax of the rotation shaft 110, the first thrust bearing 161, the rotation shaft blade 111, and the second thrust bearing 162 are disposed in this order.

More specifically, the second thrust bearing 162 is positioned closer to the impeller 120 than the first thrust bearing 161, the first thrust bearing 161 is positioned farther from the impeller 120 than the second thrust bearing 162, and at least a part of the rotation shaft 110 is positioned between the first thrust bearing 161 and the second thrust bearing 162. Preferably, the rotation shaft blade 111 is positioned between the first thrust bearing 161 and the second thrust bearing 162.

Therefore, the first thrust bearing 161 and the second thrust bearing 162 have an effect of minimizing the vibration of the rotation shaft 110 in the direction of the rotation shaft 110 due to the rotation shaft blade 111 with a large area and the action of magnetic force.

The gap sensor 70 measures the movement of the rotation shaft 110 in the axial direction Ax (the left-right direction). Of course, the gap sensor 70 may measure the movement of the rotation shaft 110 in an up-down direction (a direction orthogonal to the axial direction Ax). In addition, the gap sensor 70 measures a distance to the rotation shaft 110. Of course, the gap sensor 70 may include a plurality of gap sensors 70.

For example, the gap sensor 70 is composed of a first gap sensor 710 that measures the vertical movement of the rotation shaft 110 and a second gap sensor 720 that measures the horizontal movement of the rotation shaft 110. The second gap sensor 720 may be disposed to be spaced apart from one end of the rotation shaft 110 in the axial direction Ax.

The gap sensor 70 measures a change in displacement with the rotation shaft 110 as a change in frequency, and a control unit 700 may detect an amount of change in displacement with the rotation shaft 110 through the measured frequency change. That is, the gap sensor 70 may include an eddy current gap displacement sensor that measures a change in distance through a change in frequency.

Force of the thrust bearing 160 is inversely proportional to a square of the distance and is proportional to a square of the current. When the surge occurs in the rotation shaft 110, thrust is generated in a direction of the impeller 120 (the right direction). The force generated in the right direction should be pulled with the maximum force using the magnetic force of the thrust bearing 160, but when a position of the rotation shaft 110 is positioned in the middle of the two thrust bearings 160 (a reference position C0), in response to a rapid shaft movement, it becomes difficult to quickly move the rotation shaft 110 to the reference position C0.

Because the force of the thrust in the direction of the impeller 120 generated on the rotation shaft 110 is quite strong, when the rotation shaft 110 is positioned at the reference position C0, there is a problem in that amount of current supplied or a size of the thrust bearing 160 must be increased in order to increase the magnetic force of the thrust bearing 160.

In the present disclosure, in order to solve the above-described problem, when the surge is expected, the rotation shaft 110 is positioned eccentrically in a direction opposite to the direction in which the thrust is generated.

In order to accurately predict an occurrence of the surge, the position of the rotation shaft 110 must be accurately detected. However, an output value of the gap sensor 70 changes at a certain distance depending on operating conditions of the chiller, a temperature of the refrigerant, and a temperature around the gap sensor 70.

Accordingly, according to the present disclosure, when the output value of the gap sensor 70 changes according to temperature, it is possible to accurately measure the position of the rotation shaft 110 by performing appropriate compensation according to the temperature.

Specifically, a temperature compensation sensor 80 determines a frequency compensation value T detected by the gap sensor 70 according to a temperature change around the gap sensor 70.

For example, the temperature compensation sensor 80 may determine the frequency compensation value T by measuring the temperature change as the frequency change. Specifically, the temperature compensation sensor 80 has a same configuration as the gap sensor 70, and may be spaced apart from the rotation shaft 110 beyond a measurement range.

The temperature compensation sensor 80 may use the eddy current gap displacement sensor that measures the change in distance through the change in frequency in the same way as the gap sensor 70. When the temperature compensation sensor 80 has the same configuration as the gap sensor 70, there is an advantage that it is not necessary to provide separate table data for each type of the gap sensor 70 even if a difference in the frequency change value according to the temperature change occurs for each type of the gap sensor 70. That is, if the temperature compensation sensor 80 has the same configuration as the gap sensor 70, a compensation table is not required to determine the frequency compensation value T.

When the temperature compensation sensor 80 has the same configuration as the gap sensor 70, a positon of the temperature compensation sensor 80 is important. The temperature compensation sensor 80 is disposed farther from the rotation shaft 110 than the gap sensor 70. More specifically, the temperature compensation sensor 80 may be spaced apart from the rotation shaft 110 beyond a measurement range. The measurement range of the temperature compensation sensor 80 may be 2 mm to 5 mm.

In addition, the temperature compensation sensor 80 is provided with the same number as the gap sensor 70 and may be disposed in a pair with each gap sensor 70. The temperature compensation sensor 80 may be disposed to face the same direction as the paired gap sensor 70.

Specifically, the temperature compensation sensor 80 may include a first temperature compensation sensor 810 disposed to face the same direction as the first gap sensor 710 that measures the up-down direction movement of the rotation shaft 110, positioned adjacent to the first gap sensor 710 and a second temperature compensation sensor 820 disposed to face the same direction as the second gap sensor 720 that measures the left-right direction movement of the rotation shaft 110, positioned adjacent to the second gap sensor 720.

More specifically, the first temperature compensation sensor 810 may be spaced apart from the rotation shaft 110 farther than the measurement range of the first gap sensor 710.

The first temperature compensation sensor 810 may be positioned farther from the rotation shaft 110 than the first gap sensor 710.

The second temperature compensation sensor 820 may be spaced apart from the rotation shaft 110 farther than the measurement range of the second gap sensor 720. The second temperature compensation sensor 820 may be positioned farther from the rotation shaft 110 than the second gap sensor 720.

Hereinafter, an operation of the temperature compensation sensor 80 will be described in detail.

The temperature compensation sensor 80 is a sensor that operates irrespective of the distance measurement of the rotation shaft 110 and compensates for a distance error of the gap sensor 70 by transmitting a difference according to temperature to the gap sensor 70 as information using an output frequency value.

The temperature compensation sensor 80 determines a difference between an initial frequency value and a changed frequency value according to temperature as the frequency compensation value T. Since the temperature compensation sensor 80 is positioned outside the measurement range, the frequency changes according to the temperature change regardless of a change in an actual distance.

A method of calculating the distance using the frequency compensation value T output from the temperature compensation sensor 80 is as shown in Equation 1 below.

$$\text{Gap [mm]} = \frac{\text{Gain}}{\sqrt{Refclk - \text{Input} + T + C}} - \text{offset}$$

here,

Refclk: frequency value (constant) to be expressed as a microcomputer-readable value.

Input: frequency value (variable) output from the gap sensor 70

T: frequency compensation value T according to temperature (value stored in memory–frequency change value according to temperature)

C: gap sensor (70) temperature constant

Gain/Offset: Gap sensor (70) gain and offset

The control unit 700 calculates a distance between the rotation shaft 110 and the gap sensor 70 by reflecting the frequency compensation value T provided by the temperature compensation sensor 80.

As another example, the temperature compensation sensor 80 may determine the frequency compensation value T by measuring the temperature around the gap sensor 70. For example, the temperature compensation sensor 80 may be implemented with a temperature sensor that measures the temperature around the gap sensor (not shown) and a memory that stores a table of frequency compensation value T according to the measured temperature.

The control unit 700 calculates the amount of change in displacement with the rotation shaft 110 by reflecting the frequency compensation value T provided by the temperature compensation sensor 80 and the frequency change measured by the gap sensor 70.

Specifically, the control unit 700 determines a surge occurrence condition based on the information received from the gap sensor 70 and the frequency compensation value T of the temperature compensation sensor 80. The control unit 700 determines the surge occurrence condition based on the frequency compensation value T provided by the temperature compensation sensor 80 and the frequency change measured by the gap sensor 70.

When the position of the rotation shaft 110 measured by the gap sensor 70 is out of a normal position range (−C1~+C1), the control unit 700 may determine that a surge occurrence condition is satisfied. In addition, when the position of the rotation shaft 110 measured by the gap sensor 70 is positioned within the normal position range (−C1~+C1), the control unit 700 may determine that a surge non-occurrence condition is satisfied.

Here, the normal position range (−C1~+C1) of the rotation shaft 110 refers to an area within a predetermined distance in the left-right direction based on the reference position C0 of the rotation shaft 110. When the rotation shaft 110 rotates, the rotation shaft 110 vibrates in the axial direction Ax due to various environmental and peripheral factors, and the normal position range (−C1~+C1) of the rotation shaft 110 is a range in which such vibration is determined to be in a normal state. This normal position range (−C1~+C1) is an experimental value, and the normal position range (−C1~+C1) may be determined based on the kurtosis or skewness of the position of the rotation shaft 110. There is no limit to how to set the normal position range (−C1~+C1).

If the surge occurrence condition is satisfied, the control unit 700 may adjust the amount of current supplied to the thrust bearings 160 so that the rotation shaft 110 is eccentrically positioned in the direction opposite to the impeller 120 from the reference position C0. The position at which the rotation shaft 110 is eccentric means that the rotation shaft blade 111 is positioned between the first thrust bearing 161 and the reference position C0.

Therefore, it is possible to have a buffering time for the rotation shaft 110 to rapidly move in the direction of the impeller 120 due to the occurrence of the surge thereafter, and due to the increase of the amount of current, it becomes easy to control the rotation shaft 110 to the normal position range (−C1~+C1).

Specifically, when the surge occurrence condition is satisfied, the control unit 700 may supply current only to the first thrust bearing 161 of the first and second thrust bearings 161,162. As another example, when the surge occurrence condition is satisfied, the control unit 700 may adjust the amount of current supplied to the first thrust bearing 161 to be greater than the amount of current supplied to the second thrust bearing 162.

When the surge occurrence condition is satisfied, the control unit 700 may control the rotation shaft 110 to be eccentric in the opposite direction of the impeller 120 and then the position of the rotation shaft 110 to be fixed to an eccentric position for a certain time. That is, the control unit 700 may increase the amount of current supplied to the first thrust bearing 161 when the surge occurs after the rotation shaft 110 is eccentric in the opposite direction of the impeller 120. When the rotation shaft 110 is eccentric in the opposite direction of the impeller 120 and a vibration width is maintained below a certain standard based on the eccentric position, the control unit 700 may move the rotation shaft 110 back to the reference position C0.

When the surge non-occurrence condition is satisfied, the control unit 700 may equally adjust the amount of current supplied to the first thrust bearing 161 and the amount of current supplied to the second thrust bearing 162. Or, the surge non-occurrence condition is satisfied, the control unit 700 may control the rotation shaft 110 to be positioned at the reference position C0 by adjusting the amount of current supplied to the first and second thrust bearings 161,162.

Figure 5:
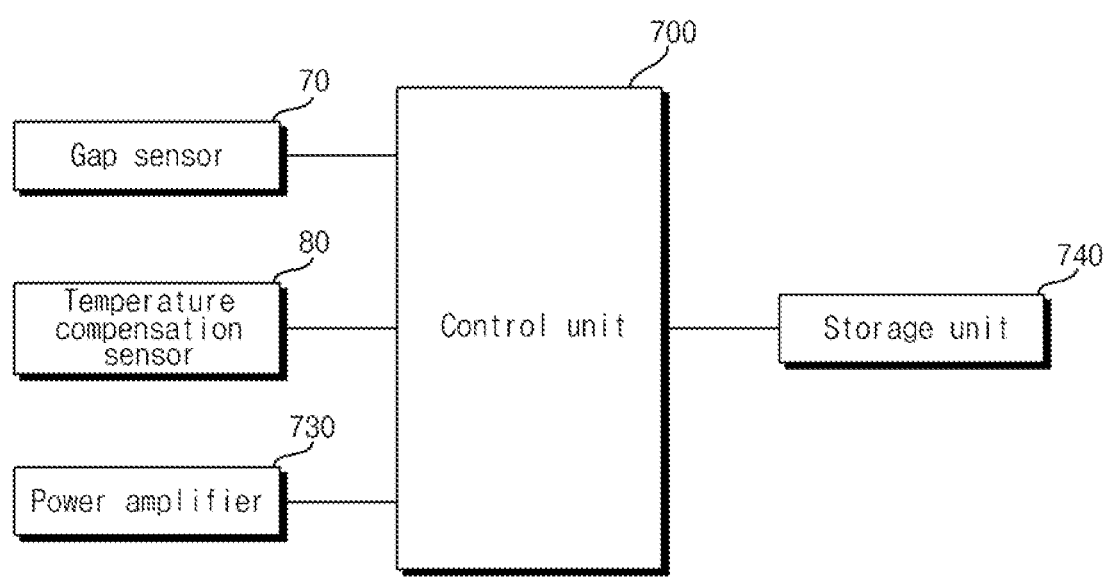
FIG. 5 is a block diagram showing a relationship between components connected to a control unit.

FIG. 5 is a block diagram showing the operation of the control unit 700. The control unit 700 controls a power amplifier 730 that amplifies the magnitude of the current applied to the gap sensor 70, the magnetic bearing 141 and the thrust bearing 160.

It is possible to adjust the magnitude of the current applied to the magnetic bearing 141 by controlling the power amplifier 730 and to grasp the change in the position of the rotation shaft 110 according to the change in the magnitude of the current by using the gap sensor 70.

The value measured by the gap sensor 70 is stored in a storage unit 740. Data such as the reference position C0, the normal position range (−C1~+C1), and the eccentric position may be previously stored in the storage unit 740. When determining the surge occurrence condition in the future, it is possible to determine whether the surge occurrence condition is by comparing the measured value and the value stored in the storage unit 740 with each other.

The temperature compensation sensor 80 determines the frequency compensation value T according to the temperature change around the gap sensor 70.

Figure 6:
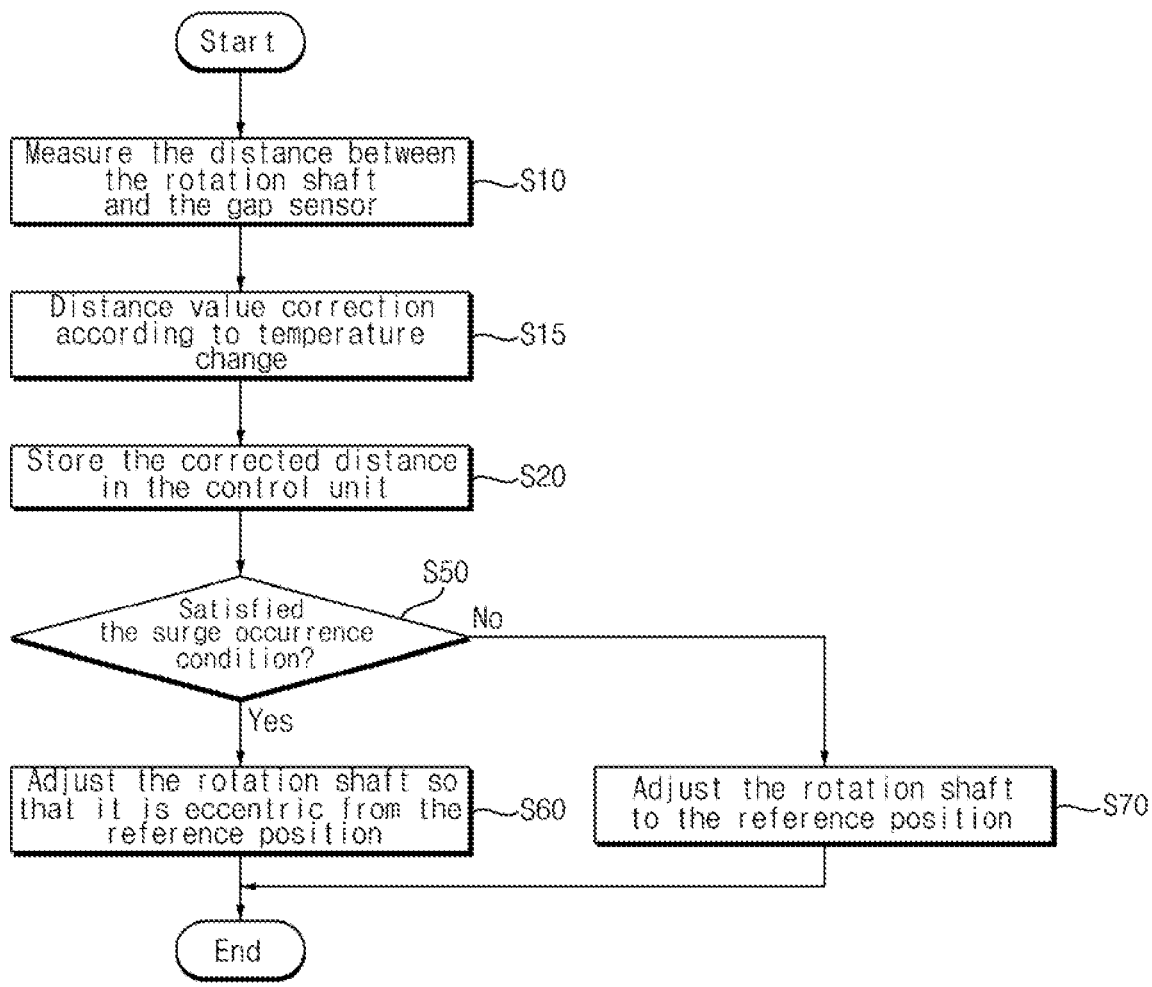
FIG. 6 is a view showing a method for controlling a compressor according to an embodiment of the present disclosure.

Meanwhile, according to an embodiment of the present disclosure, a control method of the compressor 100 is provided. FIG. 6 is a view showing the steps of the control method showing an embodiment of the present disclosure.

The control method of the compressor 100 of the present disclosure may include step (a) of measuring a distance between the gap sensor 70 and the rotation shaft 110, step (a-1) of correcting the distance value according to the temperature change, step (b) of determining the surge occurrence condition based on the distance between the gap sensor 70 and the rotation shaft 110, and step (c) of adjusting the amount of the current supplied to the thrust bearings 160 so as to position the rotation shaft 110 eccentrically in the direction opposite to the impeller 120 from the reference position C0.

In addition, when the surge non-occurrence condition is satisfied, the present disclosure may further include step (d) of positioning the rotation shaft 110 at the reference position C0 by adjusting the amount of the current supplied to the thrust bearings 160.

Specifically, step (a) measures the distance between the rotation shaft 110 and the gap sensor 70 (S10). In addition, data measured by the gap sensor 70 is stored in the control unit 700 (S20). Specifically, it may be stored in the storage unit 740 connected to the control unit 700.

Step (a-1) corrects the measured distance value between the rotation shaft 110 and the gap sensor 70 according to the temperature change (S15). Correcting the measured distance value between the rotation shaft 110 and the gap sensor 70 according to the temperature change is performed with the frequency compensation value T of the temperature compensation sensor 80 as described above. In addition, the corrected distance value between the rotation shaft 110 and the gap sensor 70 is stored in the control unit 700 (S20).

Thereafter, the surge occurrence condition is determined based on the corrected distance between the gap sensor and the rotation shaft 110 (S50). The surge occurrence condition is as described above. Specifically, the control unit 700 compares data stored in the storage unit 740 with the measured value of the gap sensor 70 to determine the surge occurrence condition or the surge non-occurrence condition.

When the surge occurrence condition is satisfied, the control unit 700 adjusts the amount of current supplied to the thrust bearings 160 so that the rotation shaft 110 is eccentrically positioned in the direction opposite to the impeller 120 from the reference position C0 (S60). Specifically, the control unit 700 may adjust the amount of current supplied to a bearing relatively far from the impeller 120 among the two thrust bearings 160 to be greater than the amount of current supplied to a bearing close to the impeller 120. More specifically, when the surge occurrence condition is satisfied, the control unit 700 may supply current only to the first thrust bearing 161 of the first and second thrust bearings 161,162.

The control unit 700 may position the rotation shaft 110 at the reference position C0 by adjusting the amount of current supplied to the thrust bearings 160 when the surge occurrence condition is satisfied (S70). Specifically, when the rotation shaft 110 is eccentric to the left direction from the reference position C0, the control unit 700 increases the amount of current supplied to the second thrust bearing 162, and when the rotation shaft 110 is eccentric to the right from the reference position C0, the control unit 700 increases the amount of current supplied to the first thrust bearing 161.

The compressor and method thereof according to the present disclosure have the following effects.

According to at least one of the embodiments of the present disclosure, the compressor capable of measuring accurately the position of a rotation shaft regardless of the operation state of a chiller, the temperature state around a gap sensor and the type of the gap sensor.

According to at least one the embodiment embodiments of the present disclosure, it is possible to prevent surge and damage to the compressor.

According to at least one the embodiment embodiments of the present disclosure, since the position of the rotation shaft is adjusted by predicting the occurrence of the surge phenomenon in advance, it is possible to promptly prevent the rotation shaft from being eccentric in an impeller direction when the surge occurs.

According to at least one the embodiment embodiments of the present disclosure, by moving the position of the rotation shaft in advance before the occurrence of the surge, it is possible to prevent damage to the compressor with less force than when it is at a reference position when the surge occurs, to reduce the volume of a thrust bearing, and to reduce the amount of current.

The effects of the present disclosure are not limited to the above-mentioned effects, and other effects that are not mentioned will be clearly understood by those skilled in the art from the description of the claims.

In the above, preferred embodiments of the present disclosure have been illustrated and described, but the present disclosure is not limited to the specific embodiments described above, of course, various modifications can be implemented by those of ordinary skill in the technical field to which the present disclosure pertains without departing from the gist of the present disclosure claimed in the claims, and these modified implementations should not be individually understood from the technical spirit or perspective of the present disclosure.

What is claimed is:

1. A compressor A compressor comprising:
   one or more impellers suctioning and compressing refrigerant;
   a motor rotating the impeller;
   a rotation shaft to which the impeller and the motor are connected;
   a gap sensor measuring a displacement change of the rotation shaft as a frequency change;
   a temperature compensation sensor determining a frequency compensation value according to a temperature change around the gap sensor; and
   a control unit calculating a displacement amount of the rotation shaft depending on the frequency compensation value provided by the temperature compensation sensor and the frequency change measured by the gap sensor,
   wherein the temperature compensation sensor measures the temperature change as the frequency change to determine the frequency compensation value, and
   wherein the temperature compensation sensor is disposed farther from the rotation shaft than the gap sensor.

2. The compressor of claim 1, wherein the temperature compensation sensor is spaced apart from the rotation shaft by exceeding a measurement range.

3. The compressor of claim 1, wherein the temperature compensation sensor has a same configuration as the gap sensor and is spaced apart from the rotation shaft by exceeding a measurement range.

4. The compressor of claim 1, further comprising at least two thrust bearings limiting vibration of the rotation shaft in an axial direction,
   wherein the control unit determines a surge occurrence condition based on the frequency compensation value provided by the temperature compensation sensor and the frequency change measured by the gap sensor.

5. The compressor of claim 4, wherein the at least two thrust bearings comprise:
   a first thrust bearing; and
   a second thrust bearing positioned closer to the impeller than the first thrust bearing, and wherein at least a part of the rotation shaft is positioned between the first thrust bearing and the second thrust bearing.

6. The compressor of claim 5, wherein, when the surge occurrence condition is satisfied, the control unit supplies current to only the first thrust bearing among the first and second thrust bearings.

7. The compressor of claim 5, wherein, when the surge occurrence condition is satisfied, the control unit controls amount of current supplied to the first thrust bearing to be greater than amount of current supplied to the second thrust bearing.

8. The compressor of claim 5, wherein the rotation shaft further comprises a rotation shaft blade extending in a rotary radial direction of the rotation shaft, and wherein the rotation shaft blade is positioned between the first thrust bearing and the second thrust bearing.

9. The compressor of claim 1, wherein the gap sensor measures an axial movement of the rotation shaft.

10. The compressor of claim 4, wherein, when a position of the rotation shaft measured by the gap sensor is out of a normal position range, the control unit determines that the surge occurrence condition is satisfied.

11. The compressor of claim 4, wherein, when a position of the rotation shaft measured by the gap sensor is positioned within a normal position range, the control unit determines that a surge non-occurrence condition is satisfied.

12. The compressor of claim 11, wherein, when the surge non-occurrence condition is satisfied, the control unit equally adjusts amount of current supplied to the first thrust bearing and amount of current supplied to the second thrust bearing.

13. The compressor of claim 1, wherein the temperature compensation sensor determines the frequency compensation value by measuring the temperature around the gap sensor.

14. The compressor of claim 13, further comprising at least two thrust bearings limiting vibration of the rotation shaft in the axial direction, wherein the control unit determines a surge occurrence condition based on the frequency compensation value provided by the temperature compensation sensor and the frequency change measured by the gap sensor.

15. The compressor of claim 14, wherein the at least two thrust bearings comprise:

a first thrust bearing; and a second thrust bearing positioned closer to the impeller than the first thrust bearing, and wherein at least a part of the rotation shaft is positioned between the first thrust bearing and the second thrust bearing.

16. The compressor of claim 15, wherein, when the surge occurrence condition is satisfied, the control unit supplies current to only the first thrust bearing among the first and second thrust bearings.

17. The compressor of claim 15, wherein, when the surge occurrence condition is satisfied, the control unit controls amount of current supplied to the first thrust bearing to be greater than amount of current supplied to the second thrust bearing.

18. The compressor of claim 13, wherein, when a position of the rotation shaft measured by the gap sensor is out of a normal position range, the control unit determines that a surge occurrence condition is satisfied.

* * * * *